US009990682B2

(12) United States Patent
Li

(10) Patent No.: US 9,990,682 B2
(45) Date of Patent: Jun. 5, 2018

(54) FACILITATING PASSENGER TO MANAGE AIRLINE RESERVATION WITHIN ELECTRONIC MESSAGE

(71) Applicant: AIRTO, INC., Brooklyn, NY (US)

(72) Inventor: Shi Li, Brooklyn, NY (US)

(73) Assignee: AIRTO, INC., Brooklyn, NY (US)

( * ) Notice: Subject to any disclaimer, the term of this patent is extended or adjusted under 35 U.S.C. 154(b) by 1096 days.

(21) Appl. No.: 14/043,558

(22) Filed: Oct. 1, 2013

(65) Prior Publication Data
US 2015/0095073 A1 Apr. 2, 2015

(51) Int. Cl.
G06Q 50/14 (2012.01)
G06Q 10/02 (2012.01)
G06Q 30/02 (2012.01)

(52) U.S. Cl.
CPC ............ G06Q 50/14 (2013.01); G06Q 10/02 (2013.01); G06Q 10/025 (2013.01); G06Q 30/0269 (2013.01)

(58) Field of Classification Search
CPC ....... G06Q 10/02; G06Q 10/025; G06Q 50/14
USPC .......................................... 705/5, 6
See application file for complete search history.

(56) References Cited

U.S. PATENT DOCUMENTS

| 6,446,045 | B1 | 9/2002 | Stone et al. | 705/26 |
| 2002/0078158 | A1* | 6/2002 | Brown | H04L 12/583 709/206 |
| 2003/0028518 | A1* | 2/2003 | Mankoff | G06F 17/30011 |
| 2005/0004820 | A1 | 1/2005 | LeMieux | 705/5 |
| 2007/0129975 | A1 | 6/2007 | Jafri et al. | 705/5 |
| 2007/0185745 | A1 | 8/2007 | Schukraft | 705/5 |

(Continued)

FOREIGN PATENT DOCUMENTS

| EP | 2 259 217 | 12/2010 |
| WO | WO 00/55780 | 9/2000 |

(Continued)

OTHER PUBLICATIONS

Chu, Ray, "What online Hong Kong travelers look for on airline/travel websites?" Hospitality Management 20, 2001, 95-100 (Year: 2001).*

(Continued)

Primary Examiner — Elaine Gort
Assistant Examiner — John P Go
(74) Attorney, Agent, or Firm — Kilpatrick Townsend & Stockton LLP

(57) ABSTRACT

Systems and methods for facilitating passengers to manage airline reservations within electronic messages are disclosed. Interactive content may be determined based on airline reservation information associated with the passengers. The interactive content may include content sets for the passengers to purchase flight options such as upgrading seats, meals, entertainment, and the like within the electronic message. The interactive content may include content sets for the passengers to interact with (e.g., select) offers by merchants. Targeted offers or advertisements may be obtained from the merchants by providing passenger information. In some examples, selection of targeted offers for presentation to the passenger in the electronic messages may be made based on historical information related to the passenger (e.g., such as product preferences manifested by the passengers in the past).

22 Claims, 6 Drawing Sheets

(56) References Cited

U.S. PATENT DOCUMENTS

| | | | |
|---|---|---|---|
| 2008/0091610 A1* | 4/2008 | Benjamin | G06Q 30/02 705/52 |
| 2008/0215383 A1 | 9/2008 | Sundt et al. | 705/5 |
| 2009/0012824 A1* | 1/2009 | Brockway | G06Q 10/02 705/6 |
| 2009/0216633 A1 | 8/2009 | Whitsett et al. | 705/14 |
| 2009/0222347 A1 | 9/2009 | Whitten | 705/14 |
| 2009/0248458 A1 | 10/2009 | Ouellette et al. | 705/5 |
| 2010/0030593 A1 | 2/2010 | Kim | 705/5 |
| 2010/0153144 A1 | 6/2010 | Miller et al. | 705/6 |
| 2010/0190510 A1* | 7/2010 | Maranhas | G06O 10/02 455/456.1 |
| 2010/0312586 A1* | 12/2010 | Drefs | G06Q 10/02 705/5 |
| 2011/0179362 A1 | 7/2011 | Craddock et al. | 715/752 |
| 2012/0101858 A1 | 4/2012 | Depasquale et al. | 705/5 |
| 2012/0101901 A1 | 4/2012 | Depasquale et al. | 705/14.58 |
| 2012/0221478 A1 | 8/2012 | Musial et al. | 705/346 |
| 2013/0054375 A1 | 2/2013 | Sy et al. | 705/14.66 |
| 2013/0124234 A1 | 5/2013 | Nilsson et al. | 705/5 |

FOREIGN PATENT DOCUMENTS

| | | | |
|---|---|---|---|
| WO | WO 2007/050378 | 5/2007 | |
| WO | WO 2008/109698 | 9/2008 | |
| WO | WO-2012092287 A1 * | 7/2012 | G06Q 30/00 |
| WO | WO 2015/050577 | 4/2015 | |

OTHER PUBLICATIONS

Seneler, Cagla Ozen, et al., "Interface Feature Prioritization for Web Services: Case of Online Flight Reservations", *Computers is Human Behavior*, vol. 25, 2009, XP 26144838A, pp. 862-877.

KLM, Royal Dutch Airlines, "KLM Meet & Seat", downloaded Jul. 21, 2013.

* cited by examiner

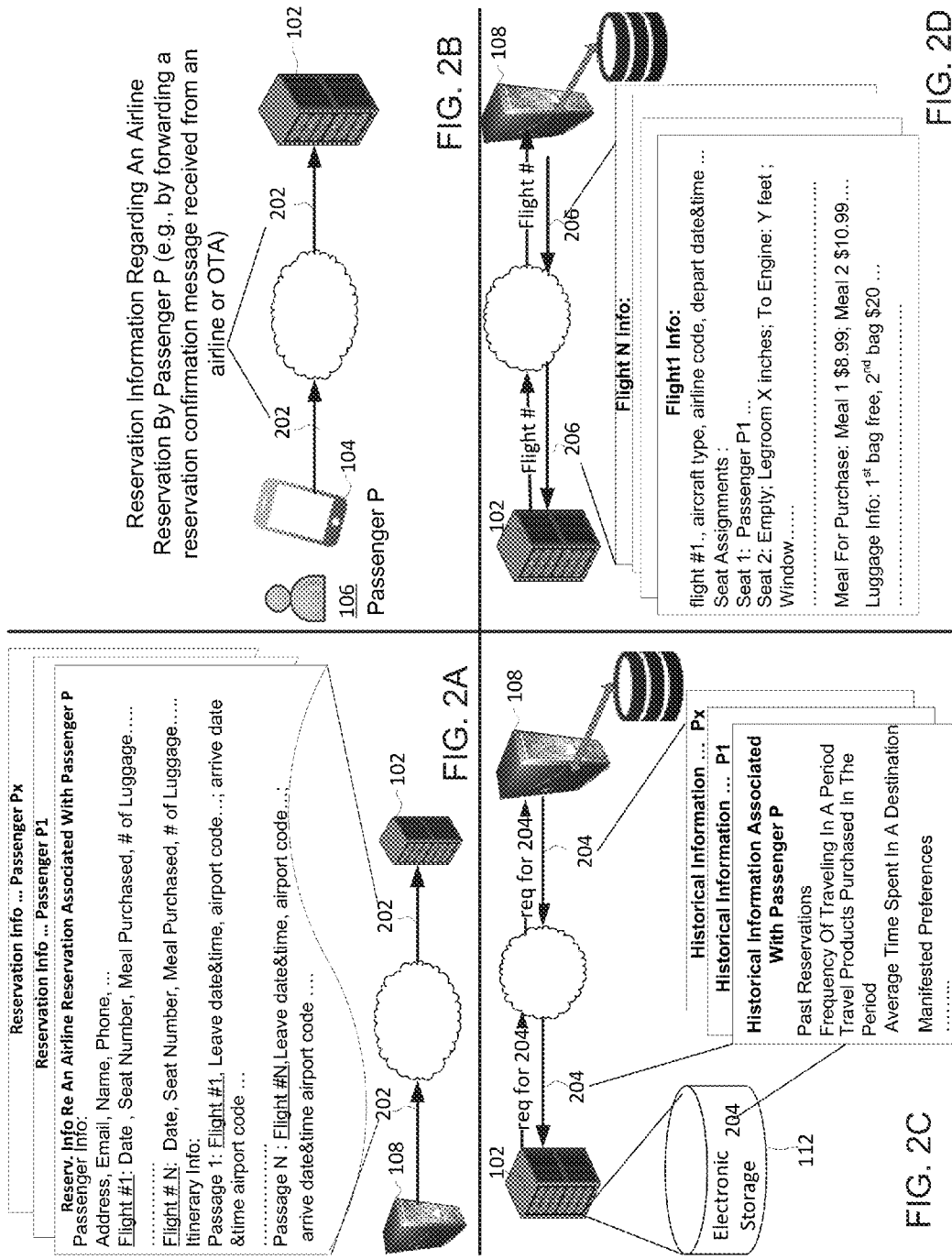

FACILITATING PASSENGER TO MANAGE AIRLINE RESERVATION WITHIN ELECTRONIC MESSAGE

FIELD OF THE DISCLOSURE

This disclosure relates to facilitating users to manage reservations through electronic messages.

BACKGROUND

Systems that generate and transmit confirmation emails confirming airline reservations made for passengers are known. In those systems, the passengers typically receive the confirmation emails at the end of airline reservation processes engaged in by the passengers. Some of the confirmation emails generated by those systems may include static content to facilitate the passengers to modify their reservations (e.g., to select and/or upgrade seats) and/or to present travel offers to the passengers (e.g. hotel, car rental, etc.). Such static content typically include images and texts presenting reservation modification options and the travel offers to the passengers along with corresponding links to web sites operated by airline carriers, online travel agencies (OTA) or merchants. The passengers may click the links and be redirected out of the confirmation emails to such websites for modifying airline reservations or for purchasing products and/or services offered by the merchants.

This process may be cumbersome to a passenger particularly in situations where the passenger reserved multiple flights with multiple airline carriers in one reservation or is interested in purchasing products or services offered by multiple merchants. In those situations, the passenger may be required by the systems to visit websites operated by each of the multiple airline carriers to make reservation modifications (e.g., to upgrade seats for fees), and/or to visit websites of each of the multiple merchants to purchase the products or services.

SUMMARY

One aspect of the disclosure relates to facilitating passengers to manage airline reservations through electronic messages. This may include generating electronic messages and transmitting the electronic messages to the passengers. The passengers may manage airline reservations within the electronic messages. Unlike the confirmation emails generated by the traditional systems described above, the disclosed electronic messages may include dynamically determined interactive content through which the passengers may be enabled to purchase seat, meal, internet, luggage, entertainment upgrades and/or other in-flight upgrades, select products and/or services offered by merchants (e.g. hotel, car rental, dinning, etc.), review social information regarding seatmates on the flights reserved by the passengers, and/or otherwise manage their airline reservations without leaving the electronic messages. Such dynamically determined interactive content may be natively presented in the electronic messages on client computing platforms associated with the passengers such that the passengers may interact with the interactive content included in the electronic messages without leaving the electronic messages. This may enhance passenger experiences in managing airline reservations as compared to the traditional systems.

In some examples, individual passengers may be enabled to receive the above-described electronic messages by providing reservation information. For example, a passenger may request the interactive electronic message by forwarding a static reservation confirmation email authored by an airline carrier or OTA. The static reservation confirmation email may not provide interactive content enabling the passenger to manage the airline reservation within the email, and/or may lack other functionality associated with the electronic messages generated by the described system. The interactive content described herein may be dynamically determined based on the reservation information received from the passenger and the electronic message containing the dynamically determined interactive content may be generated and transmitted to the passenger. This may enable the passenger to manage the airline reservation within the electronic message in accordance with the disclosure.

In some examples, social media information regarding other existing passengers on flights reserved by a given passenger may be obtained. Such social media information may include, for example, one or more of age, gender, hobby, social connections (e.g., friends, links, etc.), education background and/or any other social media information. The obtained social media information may be included in the dynamically determined interactive content for presentation in the electronic message to the given passenger. Such presentation may include presentation of specific other passengers with social media information correlated to the given passenger. This may enable the given passenger to review his/her seatmates, determine seat modification and/or upgrade his/her seat accordingly.

In some examples, historical information related to individual passengers may be maintained. Such historical information may include one or more of past travel behaviors, previous reservation choices, products purchased in connection with previous reservations, manifested service and/or product preferences and/or any other historical information regarding the passengers. For a given passenger, such historical information may be used to determine one or more of which flight options should be offered, which other incentives and/or merchant offers should be included in the electronic message for the given passenger, and/or other determinations about the electronic message for the given passenger may be made. In some examples, itinerary information regarding current reservations associated with the individual passengers, the historical information described above and/or other information related to the individual passengers may be transmitted to airline carriers, OTAs, and/or merchants to enable them to provide targeted offers for the individual passengers.

In some implementations, the system that facilitates passengers to manage airline reservations within electronic messages may include a server. The server may comprise one or more processor configured to execute computer program modules. The computer program modules may include a reservation information receipt module, passenger-itinerary information module, flight module, offer module, interactive content module, electronic message module, and/or other modules.

The reservation information receipt module may be configured to receive reservation information regarding airline reservations associated with passengers. The reservation information received by the reservation information receipt module may include passenger and itinerary information associated with the individual ones of the passengers. In some examples, such reservation information may be received by the reservation information receipt module from servers associated with the airline carriers, online travel agencies, and/or any other entities that may provide airline reservation information associated with passengers. In some exemplary implementations, the reservation information receipt module may be configured to receive such reservation information periodically via an interface, such as an application programming interface (API). The received reservation information may include passenger information associated with individual passengers, such as name, phone number, physical address, email address, and/or any other personal information that identifies the individual passengers. The passenger information may include information indicating one or more flights reserved by the individual passengers, seat numbers assigned to the individual passengers, meals purchased by the individual passengers, number of luggage space(s) reserved by the individual passengers and/or any other information regarding the reservations associated with the individual passengers.

The reservation information received by the reservation information receipt module may include itinerary information associated with individual passengers. The itinerary information may indicate one or more flight passages reserved by the individual passengers on the corresponding flights indicated in the passenger information. A given flight passage reserved by a passenger may be associated with a departure airport, time and date of a departure, and an arrival airport, time and date of an arrival. In some examples, the reservation information receipt module may be configured to receive the reservation information from client computing platforms associated with individual passengers. In those examples, the passengers may acquire reservation information from confirmation emails confirming airline authored by airline carriers, OTAs, and/or any other entities; and the passengers may simply forward such confirmation emails to the server via reservation information receipt module for further processing in accordance with the disclosure.

The passenger-itinerary information module may be configured to obtain itinerary information associated with the individual ones of the passengers based on the reservation information received by the reservation information receipt module. For an individual passenger, the obtained itinerary information may include information indicating that the individual passenger has made a reservation on a flight for a passage to a destination. This may involve extracting such itinerary information from the received reservation information. In some examples, the passenger-itinerary information module may be configured to obtain historical information regarding past travel experiences by the individual passengers. Such historical information may include various information indicating previous reservations made for the individual passengers in the past, frequency of traveling, travel products purchased, average time spent in a destination, one or more manifested travel preferences, and/or any other information related to the individual passengers.

The flight module may be configured to obtain flight information regarding flights on which reservations have been made for the passengers as indicated by the itinerary information obtained by the passenger-itinerary module. The flight information obtained by the flight module may include information indicating seat features, travel classes, seat assignments for existing passengers on the flights, price schemes for various in-flight upgrades such as seat, meal, luggage, internet, entertainment, and/or any other in-flight upgrades, frequent mile program(s) or other promotions provided by the airline carriers in connection with the flights, and/or any other flight information regarding the flights. In some examples, the flight module may be configured to request such flight information from servers associated with the airline carriers, OTAs, reservation service providers and/or any other entities that may maintain and provide such flight information. In some examples, responsive to obtaining the flight information, the flight module may be configured to obtain social media profiles associated with existing passengers of the flights indicated in the flight information. The obtained social medial profiles may include name, age, occupation, hobby, education background and/or other social information related to the existing passengers of the flights.

Responsive to the flight information regarding a flight reserved by a given passenger being obtained, the flight module may be configured to determine flight options on the flight available for purchase by the given passenger. The determined flight options may include seat upgrades, in-flight upgrades such as meal, luggage, entertainment, internet and/or any other in-flight upgrades available for purchase for the given passenger, and/or any other flight options available for purchase by the given passenger. In some examples, for determining the flight options for the given passenger, the flight module may be configured to examine historical information indicating travel experiences by the given passenger in the past.

The offer module may be configured to obtain offers provided by merchants. The offers obtained by the offer module may include product and/or service offers related to destinations of the passengers as indicated in the itinerary information obtained by the passenger-itinerary information module. The merchants that provide such offers may include hotel operators, car rental providers, vacation resort operators, restaurants, insurance companies, and/or any other service or product providers. For obtaining such offers, the offer module may be configured to communicate with the servers associated with the merchants. In some examples, the offer module may be configured to transmit itinerary information, historical information, and/or other information related to the passengers indicated in the reservation information received by reservation information receipt module to the merchants prior to obtaining the offers from the merchants. In some examples, the offer module may be configured to select offers from the offers obtained from the merchants for presentation to the passengers.

The interactive content module may be configured to dynamically determine interactive content for inclusion in electronic messages. The interactive content dynamically determined by the interactive content module may be included in electronic messages to facilitate passenger interactions within the electronic messages. As such, the dynamically determined interactive content may include controls to facilitate the passengers to make selections, provide responses, invoke commands and/or otherwise interact with the dynamically determined interactive content within the electronic messages. Some examples of such controls may include radio boxes, buttons, input boxes, interactive, interactive video, Adobe® flash programs, java applets, client logic provided by the client programs displaying the electronic messages, and/or any other controls that may be included in the interactive content to facilitate passenger interaction within the electronic messages. In some exemplary implementations, browser plugins (e.g., browser controls enable by a browser API) may be embedded in a dedicated email client for presenting such interactive content within electronic messages displayed in the dedicated email client. In some exemplary implementations, email plugins (e.g., email controls enable by an email API) may be embedded in a web mail interface for presenting such interactive content. Other implementations for presenting such interactive content within the electronic messages, for example downloaded installation packages are also contemplated.

The dynamically determined content by the interactive content module may include content sets that facilitate passengers to purchase flight options determined by the flight module within the electronic messages. Such interactive content sets may include, for example text(s), image(s), video(s) and/or any other information presenting the flight options available for purchase to the passengers within the electronic messages; and may include controls along with the flight option information to enable the passengers to select and purchase flight options within the electronic messages.

In some examples, the dynamically determined content by the interactive content module may include content sets that facilitate passengers to interact with offers obtained by the offer module 124 within the electronic messages. Such interactive content sets may include, for example text(s), image(s), video(s) and/or any other information presenting the offers obtained by the offer module 124 to the passengers within the electronic messages; and may include controls along with the offer information to enable the passengers to select and purchase the offers within the electronic messages.

In some examples, the dynamically determined interactive content by the interactive content module may include content presenting social information regarding existing passengers of the flights reserved by the passengers. In those examples, such social information may be generated by the interactive content module based on the social media profiles obtained by the flight module. Examples of such social information may include age, gender, hobby, occupation, social connections, education background, and/or any other social information associated with the existing passengers of the flights reserved by the passengers.

The electronic message module may be configured to generate interactive electronic messages to the passengers. The generated interactive electronic messages may include the interactive content dynamically determined by the interactive content module. In some examples, the electronic messages generated by the electronic message module may include confirmation messages confirming reservations associated with passengers. Interactive content such as the interactive sets that facilitate the passengers to purchase flight options, to interact with offers provided by merchants, and/or any other content sets may be included in the electronic messages generated by the electronic message module. As such, the electronic messages generated by electronic message module may enable the passengers to, for example purchase the flight options and/or offers within the electronic messages. The electronic messages generated by the electronic message module may include messages that may be relayed to the client computing platforms associated with the passengers in an asynchronous manner (e.g., such as emails), message that may be transmitted to the client computing platforms in a synchronous or near-synchronous manner (e.g., such as instant messages) and/or any other types of electronic messages.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 2A illustrates one example that reservation information regarding airline reservations associated with passengers may be received from a server associated with an airline carrier, an OTA, a reservation service provider, and/or any other entities that may provide such reservation information.

FIG. 2B illustrates one example that the reservation information regarding an airline reservation associated with a passenger may be received from client computing platform associated with the passenger.

FIG. 2C illustrates one example of obtaining historical information related to the individual passengers shown FIG. 1.

FIG. 2D illustrates one example of obtaining flight information regarding flights on which reservations have been made for the passengers shown in FIG. 1.

DETAILED DESCRIPTION

Figure 1:
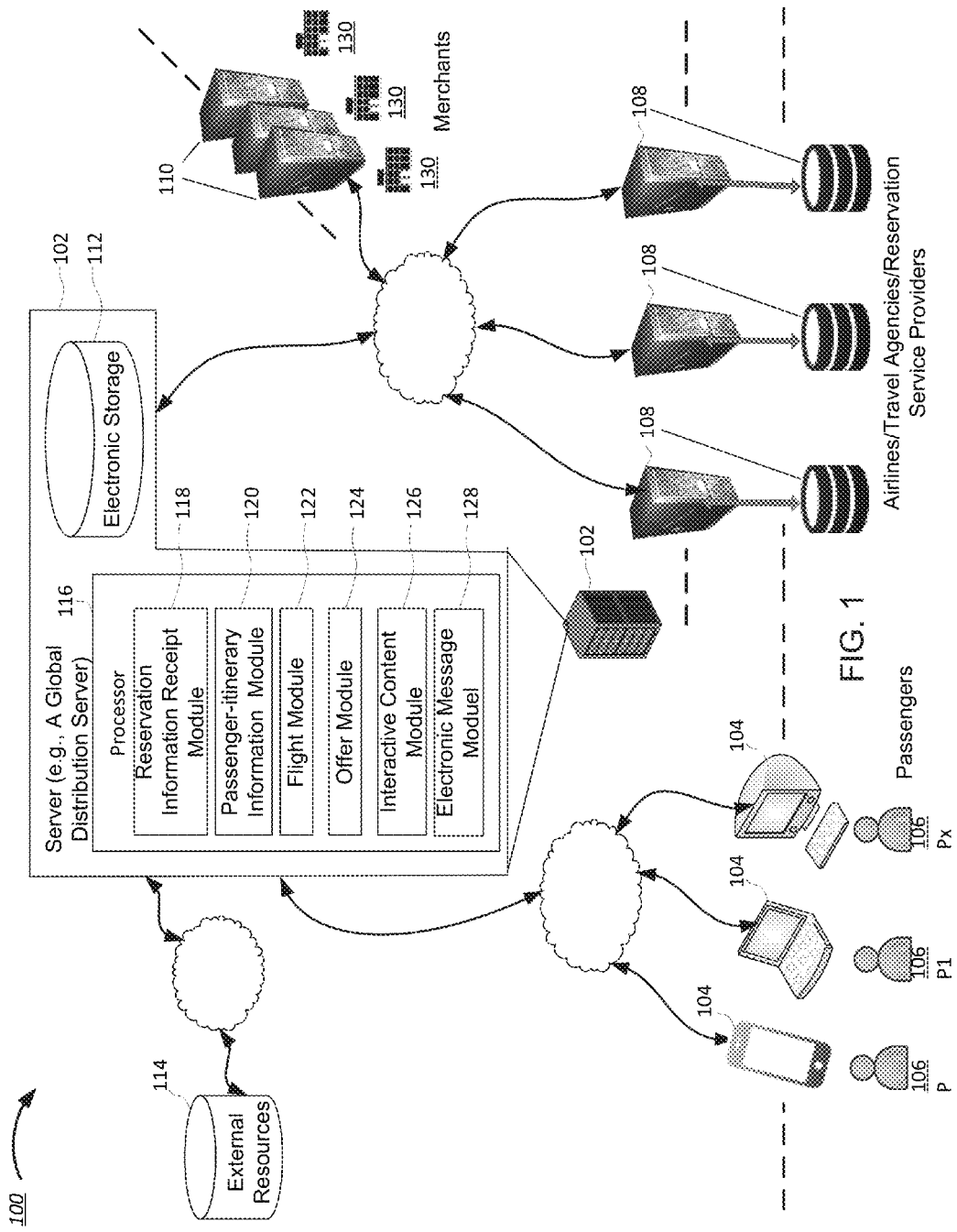
FIG. 1 illustrates an exemplary system configured to facilitate passengers to manage airline reservations with electronic messages.

FIG. 1 illustrates an exemplary system 100 configured to facilitate airline reservation management in electronic message. As illustrated in FIG. 1, in this example, the system 100 may include a server 102 configured to communicate with client computing platforms 104 associated with individual passengers 106 according to a client/server architecture via any suitable wired and/or wireless communication channels. As also illustrated in this example, the server 102 may be configured to communicate with servers 110 associated with merchants 130, which may include hotel operators, car rental operators, insurance companies, restaurants, vacation resorts, and/or any other types of merchants via any suitable wired and/or wireless communication channels. As still illustrated in this example, the server 102 may be configured to communicate with servers 108 associated with airline carriers, online travel agencies, airline reservation service providers, and/or any other entities that may maintain and provide information regarding flights operated by airline carriers via any suitable wired and/or wireless communication channels.

In this example, as shown, the server 102 comprises a processor 116 configured to execute computer program modules. The computer program modules may comprise a reservation information receipt module 118, a passenger-itinerary information module 120, a flight module 122, an offer module 124, an interactive content module 126, an, and/or any other computer program modules.

The reservation information receipt module 118 may be configured to receive reservation information regarding airline reservations associated with passengers, e.g. such as the passengers 106 shown in FIG. 1. In some examples, such reservation information may be received by the reservation information receipt module 118 from the servers 108. In some of those examples, the reservation information received by reservation information receipt module 118, in a given receipt, may include airline reservation records associated with multiple passengers. For example, the reservation information received by the reservation information receipt module 118 may include bulk reservation information associated with existing passengers of a given flight. In some other examples, the reservation information received by the reservation information receipt module 118 in a given receipt may include one reservation record associated with one passenger. In some exemplary implementations, the reservation information receipt module 118 may be configured to receive such reservation information periodically via an interface between the server 102 and servers 108. For example, an application programming interface (API) may be established between the server 102 and servers 108 such that API calls for transmitting such reservation information may be performed by the server 102 (e.g., via reservation information receipt module 118) or by the serves 108 (e.g., via a send module). In some other examples, such reservation information may be pushed to the server 102 by the servers 108 dynamically as desired by the providers of the servers 108 (e.g., the airline carriers or OTAs).

FIG. 2A illustrates one example that the reservation information may be received from a server 108 by the server 102. It will be described with references to FIG. 1. As illustrated, the reservation information received from the servers 108 may include passenger information associated with individual passengers 106, for example passenger P, P1 . . . Px as shown in FIG. 1. The passenger information may include name, phone number, physical address, email address, and/or any other personal information that identifies the individual passengers 106. As also shown, the passenger information may include information indicating one or more flights reserved by the individual passengers 106. As illustrated, the passenger information may include seat numbers assigned to the individual passengers on those flights, meals purchased by the individual passengers on those flights, number of luggage space(s) reserved by the individual passengers on those flights and/or any other information regarding the reservations associated with the individual passengers 106 on those flights.

As also shown FIG. 2A, the reservation information 202 received by the reservation information receipt module 118 from the servers 108 may include itinerary information associated with individual passengers 106. As shown in this example, the itinerary information may indicate one or more passages reserved by the individual passengers 106 on the corresponding flights indicated in the passenger information. As illustrated, a given passage reserved by a passenger 106 may be associated with a departure airport, time and date of a departure by the passenger through given flight passage, and an arrival airport, time and date of an arrival by the passenger through the given passage. As such, the passages in the itinerary information may reflect legs of flight itineraries associated with the individual passengers.

In some examples, the reservation information 202 may be received from client computing platforms 104 associated with individual passengers 106. FIG. 2B illustrates one example that the reservation information regarding an airline reservation associated with a passenger may be received from client computing platform 104 associated with the passenger by the server 102. It will be described with references to FIG. 1. As shown in this example, a passenger 106, e.g., passenger P, may transmit reservation information 202 regarding an airline reservation by the passenger 106 to the server 102. In some instances, the passenger P may acquire the reservation information from a confirmation email confirming the airline reservation made for the passenger 106 from an airline carrier, OTA, and/or any other entities. In those instances, as illustrated in FIG. 2B, the passenger 106 may simply forward such a confirmation email to the server 102 for further processing in accordance with the disclosure.

Referring back to FIG. 1, the passenger-itinerary information module 120 may be configured to obtain itinerary information associated with the individual ones of the passengers 106 based on the reservation information received by the reservation information receipt module 118. For an individual passenger, the obtained itinerary information may include information indicating that the individual passenger has made reservation on a flight for a passage to a destination. This may involve extracting such itinerary information associated with the individual passenger 106 from the received reservation information. For facilitating such extraction, the passenger-itinerary information module 120 may be configured with semantics to recognize the itinerary information associated with the individual passengers 106 included in the received reservation information. Such semantics may include tokens predetermined by the provider of the server 102 as commonly used in airline reservation information that signify itinerary information associated with passengers 106, tokens that are agreed upon between the provider of the server 102 and providers of the servers 108 to identify itinerary information included in the reservation information from the servers 108, and/or any other semantics for identifying the itinerary information associated with individual passengers 106 included in the received reservation information.

In some examples, the passenger-itinerary information module 120 may be configured to obtain historical information regarding past travel experiences by the individual passengers 106. In some exemplary implementations, such historical information may be maintained, for example by the provider of server 102 in the electronic storage 108 by storing past reservation information associated with the passengers in the electronic storage 108. In some exemplary implementations, such historical information may be maintained and obtained from the airline carriers, online travel agencies, airline reservation service providers, and/or any other entities that may maintain and provide such historical information via servers 108.

FIG. 2C illustrates one example of obtaining historical information related to individual passengers 106 by server 102 via the passenger-itinerary information module 120. As illustrated, the historical information 204 may be obtained by server 102 via passenger-itinerary information module 120 from the servers 108 and/or from the electronic storage 112. The historical information 204, as illustrated in this example, may include various information indicating, for example frequency of traveling, travel products purchased, average time spent in a destination, one or more manifested travel preferences, travel expenses, clustering, manifested shopping preferences, frequent flight routes, manifested ancillary service preferences, upsell capability, demographic, gender and/or any other information related to the individual passengers 106 past travel experiences.

Referring back to FIG. 1, the flight module 122 may be configured to obtain flight information regarding flights on which reservations have been made for passengers 106 and to determine, based on the obtained flight information, flight options available to the passengers 106 for purchase. The flight options determined by the flight module 122 may include options for passengers to select, modify or upgrade seat assignments, purchase or upgrade meals, purchase or upgrade luggage spaces, purchase or upgrade in-flight entertainment packages, purchase or upgrade in-flight internet connections, priority boarding, advanced check-in, ground transportation or transfers, airport parking, pet carriage, car rental, destination activities, and/or any other flight options that may be available to the passengers for purchase for the flights reserved by the passengers. The flight information regarding the flights obtained by the flight module 122 may include information indicating seat features (e.g., legroom length, positions relative to window, wings, plane rear, etc.), travel classes (e.g., first, business, preferred member, coach, etc.), seat assignments for existing passengers on the flights, price schemes for various in-flight upgrades such as seat, meal, luggage, internet, entertainment, and/or any other in-flight upgrades, frequent mile program(s) or other promotions provided by the airline carriers in connection with the flights, and/or any other flight information regarding the flights on which reservations have been made for the passengers 106 as indicated by the itinerary information obtained by the passenger-itinerary module 120. An example of the flight information that may be obtained by the flight module 122 is illustrated in FIG. 2D.

In some examples, the flight information obtained by the flight module 122 may be maintained and provided by airline carriers, online travel agencies, reservation service providers, and/or any other entities that may maintain and provide such flight information through servers 108. In those examples, the flight module 122 may be configured to request such flight information from the servers 108 through the interface between server 102 and servers 108, e.g., an API specifying predetermined query semantics for obtaining such flight information. For instance, the flight module 122 may be configured to compose flight information queries in accordance with the predetermined query semantics.

FIG. 2D illustrates one example of obtaining flight information 206 regarding flights on which reservations have been made for the passengers as indicated in the itinerary information obtained by the passenger-itinerary information module. As illustrated, the server 102 may initiate queries for the flight information 206 by including flight identifications such as flight numbers to the servers 108. As illustrated, the servers 108 may transmit the flight information 206 to the server 102 in response to the queries initiated by the server 102.

Figure 2E:
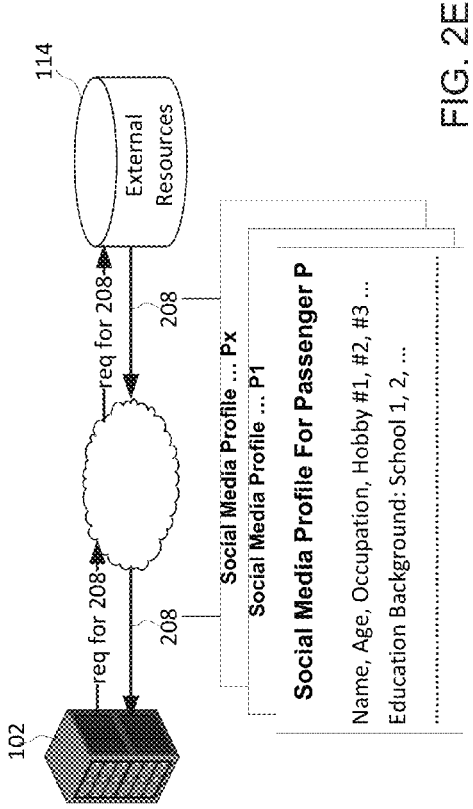
FIG. 2E illustrates one example of obtaining social media profiles associated with existing passengers on the flights reserved by the passengers shown in FIG. 1.

In some examples, responsive to obtaining flight information 206, the flight module 122 may be configured to obtain social media profiles associated with existing passengers of the flights indicated in the flight information 206. Such social medial profiles may be maintained, for example by external resources 114 as shown in FIG. 1. The external resources may include social media websites, online games, online forums, bulletin board services, and/or any other third party services providers that may maintain social media profile associated with the existing passengers of the flights indicated in the flight information 206. FIG. 2E illustrates one example of obtaining such social media profile from the external resources 114. As shown, request for obtaining the social media profiles 208 associated with the existing passenger of the flights shown in FIGS. 2A-D may be initiated by server 102 via flight module 122. In response to such requests, the external resources may provide the social media profiles according to the requests, which may include name, age, occupation, hobby, education background and/or other social information related to the existing passengers of the flights indicated in flight information 206.

Responsive to the flight information regarding a flight reserved by a given passenger being obtained, the flight module 122 may be configured to determine flight options on the flight available for purchase to the given passenger 106. The determined flight options may include seat upgrades for purchase available to the passengers on the flights, in-flight upgrades such as meal, luggage, entertainment, internet and/or any other in-flight upgrades available for purchase for the passenger, incentives available for the passenger to take another flight (e.g., such as free miles, points, free hotel stay, etc.), and/or any other flight options. For determining such flight options, the offer module 124 may be configured to analyze the obtained flight information, compare it with the current reservation associated with the passenger 106, and/or any other operations. In some examples, for determining the flight options for the given passenger 106, the flight module 122 may be configured to examine historical information indicating travel experiences by the given passenger 106 in the past. For example, the flight module 122 determine that the given passenger 106 is likely to upgrade seats for extra legroom based on the historical information associated with the given passenger 106 indicating that the given passenger made similar upgrades in previous reservations. In that example, the flight module 122 may then determine similar seat upgrades should be included in the flight options to be presented to the given passenger 106 for purchase.

Referring back FIG. 1, the offer module 124 may be configured to obtain offers provided by merchants 130 from servers 110 associated with the merchants 130. As described above, the merchants 130 may include hotel operators, car rental providers, vacation resort operators, restaurants, insurance companies, and/or any other service or product providers. The offers obtained by the offer module 124 may include offers for products and/or services related to the destinations of the passengers as indicated in the itinerary information obtained by the passenger-itinerary information module 120. Examples of such offers may include hotel offers, car rental offers, dinning offers, spa offers, vacation resort offers, and/or any other offers. For obtaining such offers, the offer module 124 may be configured to communicate with the servers 110 associated with the merchants 130 as shown in FIG. 1. This may involve requesting such offers periodically from the servers 130 through interfaces established between the server 102 and servers 110. In some implementations, such offers may be pushed to the server 102 by the merchants 130 dynamically as they become available (e.g., at the commencement and/or during a promotion period of a merchant). In some examples, the offers obtained by the offer module 124 may be associated with expiration dates and may be stored (e.g., cached) by the server 102 in the electronic storage 112 until such expiration dates.

In some examples, the offer module 124 may be configured to transmit itinerary information, historical information, and/or other information related to the passengers 106 to servers 110 to facilitate the merchants to provide the offers. With such information, the merchants may be facilitated to target specific passengers. By way of a non-limiting example, itinerary information such as dates and time when a passenger will travel to a destination, historical information such as travel products purchased by the passenger in the past, product preferences manifested by the passenger and/or other historical information may be transmitted to servers 110 to enable the merchants 130 to determine specific offers that may target the passenger.

In some exemplary implementations, a set of offers may be obtained from a given merchant by the offer module 124 in one request. For example, in a case where a passenger will spend more than 48 hours in a destination, the offer module 124 may obtain multiple offers in an offer set from a car rental operator operating in the destination. The individual ones of the multiple offers may include offers of different level cars are available for rental at the car rental operator's facility in the destination during that 48 hour period (e.g., an offer for a compact size car, an offer for a midsize car, an offer for a full size car, and so on).

In some examples, the offer module 124 may be configured to select offers from the offers obtained from the merchants 130 for presentation to the passengers 106. By way of a non-limiting example, the offer module 124 may obtain, for a given passenger 106, 5 sets of hotel offers from 5 different hotel operators; each of the 5 sets of hotel offers may include multiple offers of different levels of rooms available to the given passenger 106 during his stay in the destination. In that example, the offer module 124 may be configured to select one or more offers from the multiple sets of offers for presentation to the given passenger 106. In some exemplary implementations, such selection may be based on historical information related to the passenger 106 as obtained by the passenger-itinerary information module 120 (e.g., such as manifested preferences by the given passenger 106 in the past: price, minimum stars, preferred areas, and etc.). In some examples, such selection may be however made as desired by the provider of server 102 via offer module 124. For example, the offer module 124 may be configured to select offers from merchants preferred by the provider of the server 102.

Figure 2F:
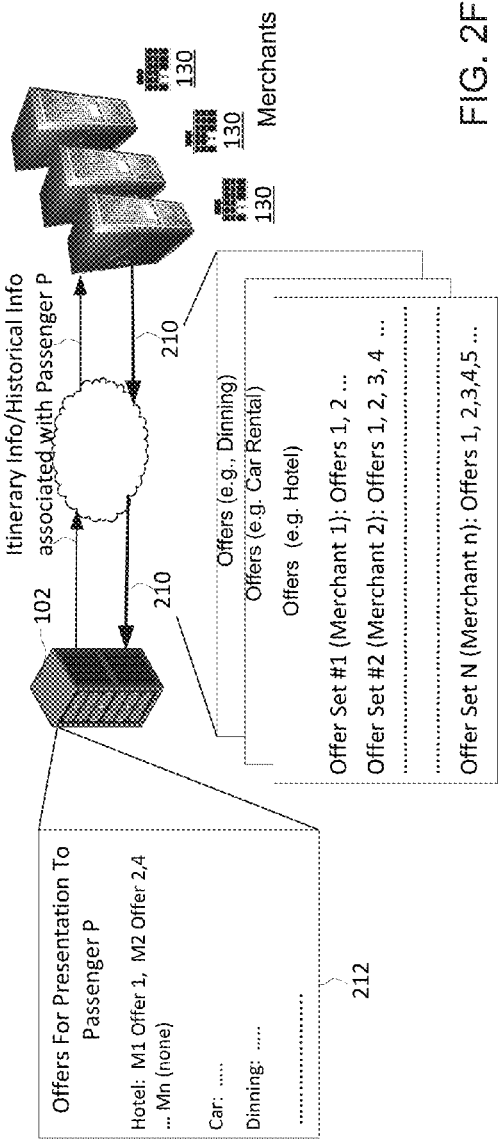
FIG. 2F illustrates one example of obtaining offers from the merchants shown in FIG. 1.

FIG. 2F illustrates one example of obtaining offers from merchants. As shown in this example, the server 102 may be configured to obtain offers from servers 110 associated with multiple merchants 130 via offer module 124. As illustrated, for obtaining the offers, the offer module 124 may transmit itinerary information, historical information and/or any other information related to a given passenger, e.g., passenger P in this example to the servers 110. As shown, in response to the request for offers for passenger P, the servers 110 may transmit multiple offers 210 to the server 102. As illustrated, the offers may include multiple offer sets from the merchants 130, e.g., merchant 1 may offer a first set of hotel offers to passenger P, merchant 2 may offer a second set of hotel offers, and so on. As shown, the server 102 may select offers 212 from the obtained offers 210 for presentation to the passenger P. As described above, such offer selection may be made by server 102 via offer module 124 as however desired by the provider of the server 102.

Referring back to FIG. 1, the interactive content module 126 may be configured to dynamically determine interactive content for inclusion in electronic messages. The interactive content dynamically determined by the interactive content module 126 may be included in electronic messages to facilitate user interactions with the electronic messages. Accordingly, the interactive content dynamically determined by the interactive content module 126 may be executed by client programs running on the client computing platforms 104 associated with individual passengers 106. The dynamically determined interactive content by the interactive content module 126 therefore may include executable logic to cause the client programs to receive commands from the passengers 106. The dynamically determined interactive content may include controls to facilitate the individual passengers to provide such commands within the electronic messages. Some examples of such controls may include radio boxes, buttons, input boxes, interactive images (e.g., certain parts of the interactive image may be clicked to cause command corresponding to those parts to be invoked), interactive video (e.g., having clickable bars embedded in the video), Adobe® flash programs, java applets, client logic provided by the client programs displaying the electronic messages, and/or any other controls that may be included in the interactive content to facilitate passenger interaction within the electronic messages. In some exemplary implementations, browser plugins (e.g., browser controls enable by a browser API) may be embedded in a dedicated email client for presenting such interactive content within electronic messages displayed in the dedicated email client. In some exemplary implementations, email plugins (e.g., email controls enable by an email API) may be embedded in a web mail interface for presenting such interactive content. Other implementations for presenting such interactive content within the electronic messages, for example downloaded installation packages are also contemplated.

In some examples, the interactive content dynamically determined by the interactive content module 126 may be natively presented in the client programs on the client computing platforms 104 in electronic messages. For example, the interactive content may include tags, codes, scripts, commands, directives, logic and/or any other elements to cause a client program to present and facilitate user interaction with the interactive content in the electronic messages without leaving the electronic messages.

The dynamically determined content by the interactive content module 126 may include content sets that facilitate passengers to purchase flight options determined by flight module 122 within the electronic messages. Such interactive content sets may include, for example texts, images, video and/or any other information presenting the flight options available for purchase to the passengers within the electronic messages; and may include radio boxes, buttons, input boxes and/or any other controls along with the flight option information such that the passengers may use such controls to select and purchase flight options within the electronic messages. Upon the selections by the passengers via the interactive content sets, responses may be generated, for example by the client programs displaying the electronic messages and transmitted to the server 102. Upon receiving such responses, the server 102 (e.g., via a purchase module not illustrated in FIG. 1) may purchase the flight options from airline carriers on behalf of the passengers and charge credit accounts associated with the passengers accordingly.

The dynamically determined content by the interactive content module 126 may include offers obtained by the offer module 124 such that the passenger 106 may interact with the offers (e.g., accept) within the electronic messages. Such interactive content sets may include, for example text(s), image(s), video(s) and/or any other information presenting the offers obtained by the offer module 124 to the passengers within the electronic messages; and may include radio boxes, buttons, input boxes and/or any other controls along with the offer information such that the passengers may use such controls to select and purchase the offers within the electronic messages. Upon the selections by the passengers via the interactive content sets, responses may be generated, for example by the client programs displaying the electronic messages and transmitted to the server 102. Upon receiving such responses, the server 102 (e.g., via a purchase module not illustrated in FIG. 1) may purchase the products and/or services included in the offer(s) selected by the passengers from corresponding merchant(s) on behalf of the passengers and charge credit accounts associated with the passengers accordingly.

In some examples, the dynamically determined interactive content by the interactive content module 126 may include content presenting social information regarding existing passengers of the flights reserved by the passengers 106. In those examples, such social information may be generated by the interactive content module 126 based on the social media profiles obtained by the flight module 122. Examples of such social information may include age, gender, hobby, occupation, education background, and/or any other social information associated with the existing passengers of the flights reserved by the passengers 106. The interactive content module 126 may include such social information in the interactive content along with seat assignments for presentation to the passengers 106 in the electronic messages. This may facilitate the passengers 106 to review seat mates and/or to make seat modification according to such social information. For example, the passenger 106 may be inclined to change his/her seat next to another passenger who share similar hobby and/or education background with the passenger 106 as indicated by the social media information included in the interactive content presented in the electronic messages.

The electronic message module 128 may be configured to generate interactive electronic messages to the passengers 106. The generated interactive electronic messages may include the interactive content sets determined by the interactive content module 126. In some implementations, the electronic message module 128 may be configured to effectuate such email messages to client computing platforms 104 associated with the passengers 106. In some examples, the electronic messages generated by the electronic message module 128 may include confirmation messages confirming the reservations associated with the passengers 106. In those examples, the electronic messages may serves as a reservation confirmation and as well as a platform for the passenger to modify their reservations, interacting with offers and/or otherwise interacting with electronic messages within the electronic messages. As described above, the electronic messages generated by the electronic message module 128 may include interactive content dynamically determined by the interactive content module 126 such that the passengers 106 may provide responses, for example to select flight options and/or offers included in the electronic messages within the electronic messages. The electronic messages generated by the electronic message module 128 may include messages that may be relayed to the client computing platforms 104 in an asynchronous manner (e.g., such as emails), messages that may be transmitted to the client computing platforms 104 in a synchronous or near-synchronous manner (e.g., instant messages), and/or any other type of electronic messages.

Figure 2G:
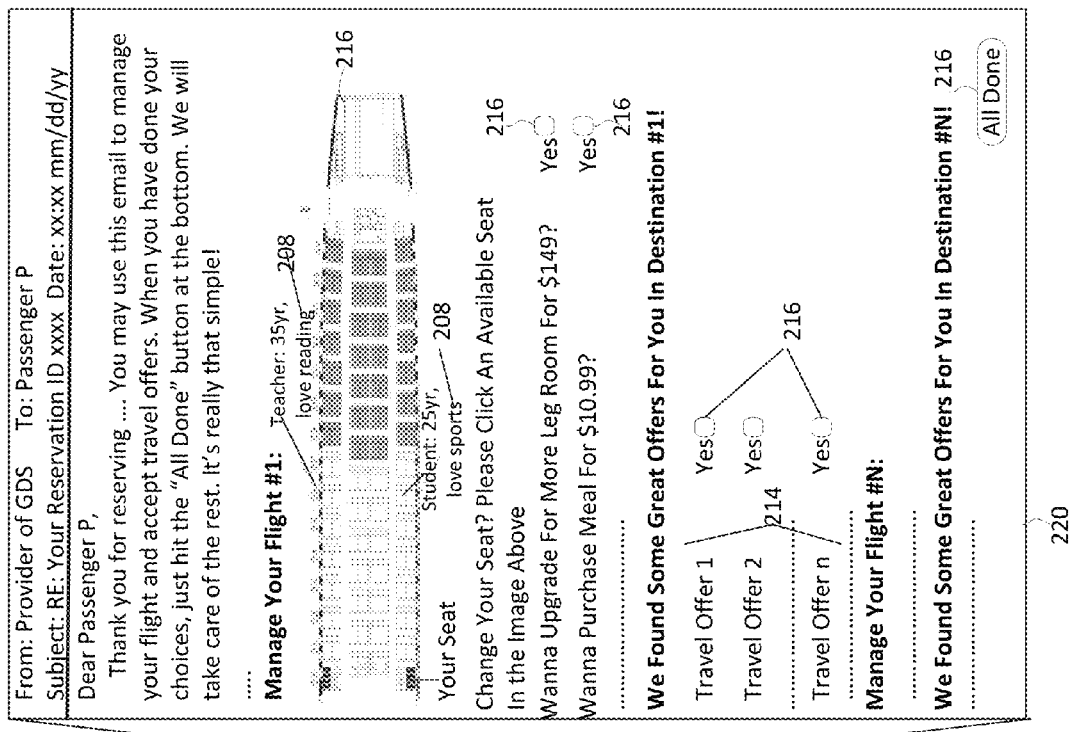
FIG. 2G illustrates one example of transmitting an electronic message to facilitate a passenger to purchase flight options and interact with travel offers within the electronic message in accordance with the disclosure.
Figure 2G:
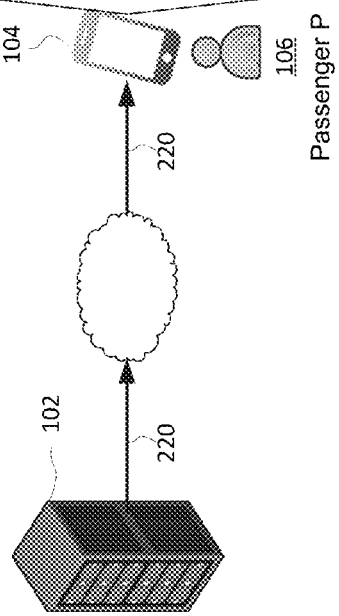

FIG. 2G illustrates one example of transmitting an electronic message to facilitate a passenger to purchase flight options and interact with travel offers within the electronic message in accordance with the disclosure. As shown, an electronic message 220 (e.g., such as a message serving a purpose of confirming an airline reservation associated with the passenger) may be generated by the server 102 via the electronic message module 128 and transmitted to the client computing platform 104 associated with a passenger 106, passenger P in this example. As illustrated, the electronic message 220 may include dynamic interactive content 216 that facilitate the passenger to accept flight options and travel offers 214. As shown, for such facilitation, the dynamic interactive content may include interactive image—a clickable flight seat chart image in this example, radio boxes for selecting and accepting the flight options and travel offers, and a button—the "all done" button) in this example to enable the passenger P to submit seat modification, selections of flight options and travel offers within the electronic message 220 as illustrated. As shown, the interactive seating chart image may have indication indicating social status of the seat occupiers. This may enable the passenger P to make seat modification or upgrade choices.

Referring back to FIG. 1, the server 102, client computing platforms 104, servers 108, 110 and/or external resources 114 may be operatively linked via one or more electronic communication links. For example, such electronic communication links may be established, at least in part, via a network such as the Internet and/or other networks. It will be appreciated that this is not intended to be limiting, and that the scope of this disclosure includes implementations in which server 102, client computing platforms 104, servers 108, 110 and/or external resources 114 may be operatively linked via some other communication media.

A given client computing platform 104 may include one or more processors configured to execute computer program modules. The computer program modules may be configured to enable an expert or user associated with the given client computing platform 104 to interface with servers 102, 108, 110 and/or external resources 114, and/or provide other functionality attributed herein to client computing platforms 104. By way of non-limiting example, the given client computing platform 104 may include one or more of a Smartphone, a desktop computer, a laptop computer, a handheld computer, a tablet computing platform, a NetBook, a gaming console, and/or other computing platforms.

External resources 114 may include sources, hosts, and providers of information exchanges outside of servers 102, external entities participating with severs 102 and/or 104, and/or other resources. As described above, the external resources 114 may include servers associated with third part service providers (e.g., social media websites, BBS sites, online game providers, blog sites, etc.) affiliated with the provider(s) of the server 102. In some examples, the external resources 114 may include servers associated with data servers affiliated with the provider of server 102 (e.g., credit card transaction data providers, consumer purchase analysis providers, traveler behavior analysis providers, and/or any other data providers that may analyze various consumer data). It should be appreciated that the data provided by the external resource 104 is not necessarily limited to one layer of data in direct relationship with the passengers; data clustering is also contemplated. In some implementations, some or all of the functionality attributed herein to external resources 114 may be provided by resources included in servers 102.

Electronic storages 112 may comprise non-transitory storage media that electronically stores information. The electronic storage media of Electronic storage 112 may include one or both of system storage that is provided integrally (i.e., substantially non-removable) with servers 102 and/or removable storage that is removably connectable to servers 102 via, for example, a port (e.g., a USB port, a firewire port, etc.) or a drive (e.g., a disk drive, etc.). Electronic storages 112 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storages 112 may include one or more virtual storage resources (e.g., cloud storage, a virtual private network, and/or other virtual storage resources). Electronic storages 112 may store software algorithms, information determined by processors 116, information received from servers 102, information received from client computing platforms 104, servers 108, 110 and/or other information that enables servers 102 to function as described herein.

Processor 116 is configured to provide information processing capabilities in server 102 respectively. As such, Processors 116 may include one or more of a digital processor, an analog processor, a digital circuit designed to process information, an analog circuit designed to process information, a state machine, and/or other mechanisms for electronically processing information. Although processor x is shown in FIG. 1 as a single entity, this is for illustrative purposes only. In some implementations, Processors 116 may include a plurality of processing units. These processing units may be physically located within the same device, or Processors 116 may represent processing functionality of a plurality of devices operating in coordination. The processors 116 may be configured to execute modules 118, 120, 122, 124, 126, 128. Processors 116 may be configured to execute modules 118, 120, 122, 124, 126, 128 by software; hardware; firmware; some combination of software, hardware, and/or firmware; and/or other mechanisms for configuring processing capabilities on processors 116. As used herein, the term "module" may refer to any component or set of components that perform the functionality attributed to the module. This may include one or more physical processors during execution of processor readable instructions, the processor readable instructions, circuitry, hardware, storage media, or any other components.

It should be appreciated that although modules 118, 120, 122, 124, 126, 128 are illustrated in FIG. 1 as being implemented within a single processing unit, in implementations in which processors 116 includes multiple processing units, one or more of modules 118, 120, 122, 124, 126, 128 may be implemented remotely from the other modules. The description of the functionality provided by the different modules 118, 120, 122, 124, 126, 128 described below is for illustrative purposes, and is not intended to be limiting, as any of modules 118, 120, 122, 124, 126, 128 may provide more or less functionality than is described. For example, one or more of modules 118, 120, 122, 124, 126, 128 may be eliminated, and some or all of its functionality may be provided by other ones of modules 118, 120, 122, 124, 126, 128. As another example, processors 116 may be configured to execute one or more additional modules that may perform some or all of the functionality attributed below to one of modules 118, 120, 122, 124, 126, 128.

Figure 3:
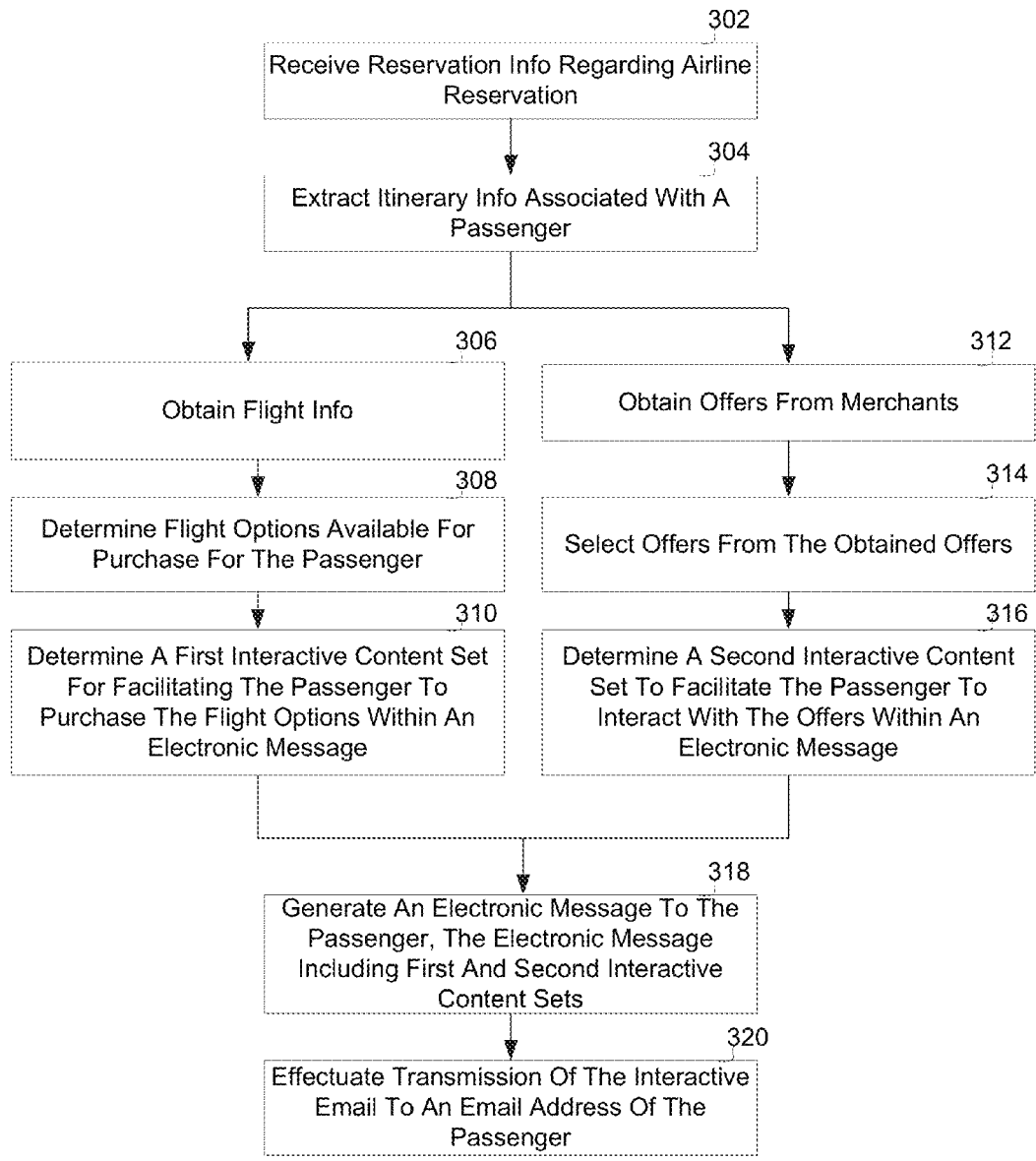
FIG. 3 illustrates a method of facilitating a passenger to manage an airline reservation through an electronic message.

FIG. 3 illustrates a method 300 of facilitating a passenger to manage an airline reservation through an electronic message. The operations of method 300 presented below are intended to be illustrative. In some embodiments, method 300 may be accomplished with one or more additional operations not described, and/or without one or more of the operations discussed. Additionally, the order in which the operations of method 300 are illustrated in FIG. 3 and described below is not intended to be limiting.

In some embodiments, method 300 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 in response to instructions stored electronically on an electronic storage medium. The one or more processing devices may include one or more devices configured through hardware, firmware, and/or software to be specifically designed for execution of one or more of the operations of method 300.

At an operation 302, reservation information regarding airline reservation may be received. In some examples, the airline reservation information received in operation 302 may include airline reservation records associated with multiple passengers; and in some other examples, the reservation information received in operation 302 may include one reservation record associated with one passenger. In some examples, such reservation information may be received from servers associated with airline carriers, OTAs, reservation service providers, and/or any other entities. In some examples, such reservation information may be received from client computing platforms associated with individual passengers (e.g., by forwarding static reservation confirmation email from airline carriers or OTAs). In some implementations, operation 302 may be performed by a reservation information receipt module the same as or similar to reservation information receipt module 118 (shown in FIG. 1 and described herein).

At an operation 304, itinerary information associated with a passenger may be extracted from the reservation received in operation 302. The itinerary information extracted in operation 304 may indicate one or more passages reserved by the passenger on one or more corresponding flights. A given passage reserved by the passenger may be associated with a departure airport, time and date of a departure by the passenger through given flight passage, and an arrival airport, time and date of an arrival by the passenger through the given passage. In some implementations, operation 304 may be performed by a passenger-itinerary information module the same as or similar to passenger-itinerary information module 120 (shown in FIG. 1 and described herein).

At an operation 306, flight information regarding the flights indicated in itinerary information extracted in operation 304 may be obtained. The flight information obtained in operation 306 may include information indicating seat features (e.g., legroom length, positions relative to window, wings, plane rear, etc.), travel classes (e.g., first, business, preferred member, coach, etc.), seat assignments for existing passengers on the flights, price schemes for various in-flight upgrades such as seat, meal, luggage, internet, entertainment, and/or any other in-flight upgrades, frequent mile program(s) or other promotions provided by the airline carriers in connection with the flights, and/or any other flight information regarding the flights on which reservations have been made for the passengers as indicated by the itinerary information obtained in operation 304. In some examples, the flight information obtained in operation 306 may be maintained and provided by airline carriers, online travel agencies, reservation service providers, and/or any other entities that may maintain and provide such flight information. In those examples, the flight operation may be, accordingly, obtained from the servers associated with these entities. In some implementations, operation 306 may be performed by a flight module the same as or similar to flight module 122 (shown in FIG. 1 and described herein).

At an operation 308, flight options available for purchase may be determined for the passenger based on the flight information obtained in operation 306. The flight options determined in operation 308 may include seat upgrades for purchase available to the passengers on the flights, in-flight upgrades such as meal, luggage, entertainment, internet and/or any other in-flight upgrades available for purchase for the passenger, incentives available for the passenger to take another flight (e.g., such as free miles, points, free hotel stay, etc.), and/or any other flight options. For determining such flight options, the flight information obtained in operation 306 may be analyzed, and compared with the reservation information associated with the passenger as received in operation 302. In some implementations, operation 308 may be performed by a flight module the same as or similar to flight module 122 (shown in FIG. 1 and described herein).

At an operation 310, a first interactive content set for facilitating the passenger to purchase the flight options determined in operation 308 within an electronic message may be dynamically determined. The first interactive content set may include, for example texts, images, video and/or any other information presenting the flight options available for purchase to the passenger within the electronic message; and may include radio boxes, buttons, input boxes and/or any other controls along with the flight option information such that the passenger may use such controls to select and purchase flight options within the electronic message. In some implementations, operation 310 may be performed by an interactive content module the same as or similar to interactive content module 126 (shown in FIG. 1 and described herein).

At an operation 312, offers may be obtained from merchants for presentation to the passenger in the electronic message. The merchants may include hotel operators, car rental providers, vacation resort operators, restaurants, insurance companies, and/or any other service or product providers. The offers obtained in operation 312 may include offers for products and/or services related to the destinations of the passenger as indicated in the itinerary information obtained in operation 304. Examples of the offers obtained in operation 312 may include hotel offers, car rental offers, dinning offers, spa offers, vacation resort offers, and/or any other offers. In some implementations, operation 312 may be performed by an offer module the same as or similar to offer module 124 (shown in FIG. 1 and described herein).

At an operation 314, one or more offers may be selected from the offers obtained in operation 312. In some exemplary implementations, the offer selection in operation 314 may be based on historical information related to the passenger, e.g., such as traveler profile, travel purpose/types, transaction data, social profile, manifested preferences of the passenger in the past: such as price, minimum number of days for which the passenger will stay in any destination, preferred areas at destinations, expenses by the passenger in past travel experiences including cost for trips/flights/hotels/ cars booked from any service provider(s) or agency/agencies in the past, and/or any other historical information about the passenger. In some examples, such selection may be however made as desired by a provider of the system 100 described above. In some implementations, operation 314 may be performed by an offer module the same as or similar to offer module 124 (shown in FIG. 1 and described herein).

At operation 316, a second interactive content set for facilitating the passenger to interact with the offers selected in operation 314 within an electronic message may be dynamically determined. The second interactive content set may include, for example texts, images, video and/or any other information presenting the offers to the passenger within the electronic message; and may include radio boxes, buttons, input boxes and/or any other controls along with the offer information such that the passenger may use such controls to select and purchase product and/or services included in the offers within the electronic message. In some implementations, operation 316 may be performed by an interactive content module the same as or similar to interactive content module 126 (shown in FIG. 1 and described herein).

At an operation 318, an electronic message including the first and second interactive content sets may be generated to the passenger. In some examples, the electronic messages generated in operation 318 may include confirmation messages confirming the reservations associated with the passengers. In those examples, the electronic messages may serves as a reservation confirmation and as well as a platform for the passenger to modify their reservations, interacting with offers and/or otherwise interacting with electronic messages within the electronic messages. As described above, the electronic messages generated in operation 318 may include interactive content dynamically determined in operations 310 and 316 such that the passenger may provide responses, for example to select flight options and/or offers included in the electronic message within the electronic messages. The electronic message generated in operation 316 may include messages that may be relayed to the client computing platform associated with the passenger in an asynchronous manner (e.g., such as an email), messages that may be transmitted to the client computing platform associated with passenger in a synchronous or near-synchronous manner (e.g., instant messages), and/or any other type of electronic messages. In some implementations, operation 318 may be performed by an electronic message module the same as or similar to electronic message module 128 (shown in FIG. 1 and described herein).

At an operation 320, the transmission of the electronic message generated in operation 318 may be effectuated. In some implementations, operation 318 may be performed by an electronic message module the same as or similar to electronic message module 128 (shown in FIG. 1 and described herein).

Figure 4:
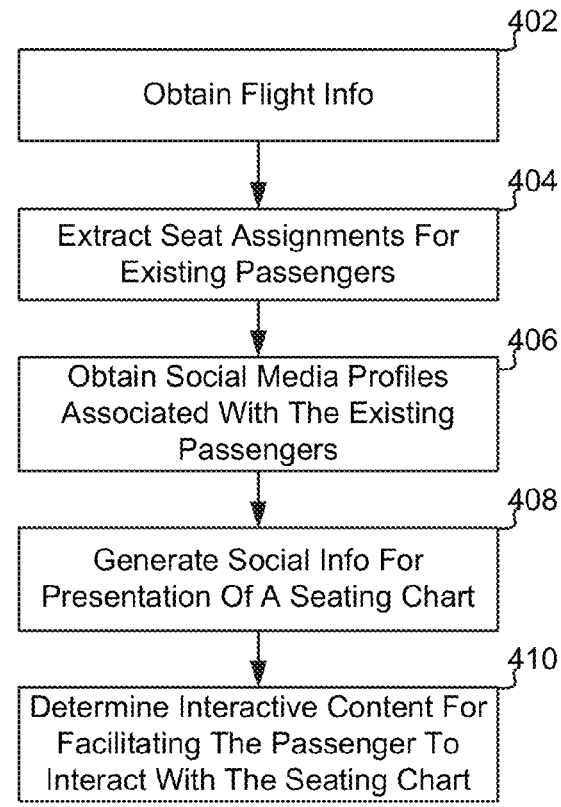
FIG. 4 illustrates a method of obtaining social media profiles associated with existing passengers of a flight for presentation in an interactive seating chart included in an electronic message.

FIG. 4 illustrates a method 400 of obtaining social media profiles associated with existing passengers of a flight for presentation in an interactive seating chart included in an electronic message. The operations of method 400 presented below are intended to be illustrative. In some embodiments, method 400 may be accomplished with one or more additional operations not described, and/or without one or more of the operations discussed. Additionally, the order in which the operations of method 400 are illustrated in FIG. 4 and described below is not intended to be limiting.

In some embodiments, method 400 may be implemented in one or more processing devices (e.g., a digital processor, an analog processor, a digital circuit designed to process information, an analog circuit designed to process information, a state machine, and/or other mechanisms for electronically processing information). It will described with references to FIG. 3. The one or more processing devices may include one or more devices executing some or all of the operations of method 400 in response to instructions stored electronically on an electronic storage medium. The one or more processing devices may include one or more devices configured through hardware, firmware, and/or software to be specifically designed for execution of one or more of the operations of method 400.

At an operation 402, flight information regarding the flights indicated in itinerary information extracted in operation 304 may be obtained. The flight information obtained in operation 402 may include information indicating seat assignments for existing passenger of the flights. In some implementations, operation 402 may be performed by a flight module the same as or similar to flight module 122 (shown in FIG. 1 and described herein).

At an operation 404, the information indicating seat assignments for the existing passengers of the flights may be extracted from the flight information obtained in operation 402. In some implementations, operation 404 may be performed by a flight module the same as or similar to flight module 122 (shown in FIG. 1 and described herein).

At an operation 406, social medial profiles associated with the existing passengers of flights as indicated in the information extracted in operation 404 may be obtained. The social medial profiles obtained in operation 406 may be maintained, for example by social media websites, online games, online forums, bulletin board services, and/or any other third party services providers that may maintain social media profile associated with the existing passengers of the flights indicated in the flight information obtained in operation 404. Examples of social media profiles may include name, age, occupation, hobby, education background and/or other social media information related to the existing passengers of the flights indicated in the flight information obtained in operation 404. In some implementations, operation 406 may be performed by a flight module the same as or similar to flight module 122 (shown in FIG. 1 and described herein).

At an operation 408, social information associated with the existing passengers may be generated for presentation in an interactive seating chart. This may involve determining permissible information that may be presented in such a seating chat, matching the social information with the seats occupied by the existing passengers, and/or any other operations. In some implementations, operation 408 may be performed by a flight module the same as or similar to flight module 122 (shown in FIG. 1 and described herein).

At an operation 410, interactive content for facilitating the passenger to interact with the seating chart generated in operation 408 may be determined. In some implementations, operation 408 may be performed by a flight module the same as or similar to flight module 122 (shown in FIG. 1 and described herein).

At an operation 408, flight options available for purchase may be determined for the passenger based on the flight information obtained in operation 406. The flight options determined in operation 408 may include seat upgrades for purchase available to the passengers on the flights, in-flight upgrades such as meal, luggage, entertainment, internet and/or any other in-flight upgrades available for purchase for the passenger, incentives available for the passenger to take another flight (e.g., such as free miles, points, free hotel stay, etc.), and/or any other flight options. For determining such flight options, the flight information obtained in operation 406 may be analyzed, and compared with the reservation information associated with the passenger as received in operation 402. In some implementations, operation 408 may be performed by a flight module the same as or similar to flight module 122 (shown in FIG. 1 and described herein).

At an operation 410, a first interactive content set for facilitating the passenger to purchase the flight options determined in operation 408 within an electronic message may be dynamically determined. The first interactive content set may include, for example texts, images, video and/or any other information presenting the flight options available for purchase to the passenger within the electronic message; and may include radio boxes, buttons, input boxes and/or any other controls along with the flight option information such that the passenger may use such controls to select and purchase flight options within the electronic message. In some implementations, operation 410 may be performed by an interactive content module the same as or similar to interactive content module 126 (shown in FIG. 1 and described herein).

Figure 5:
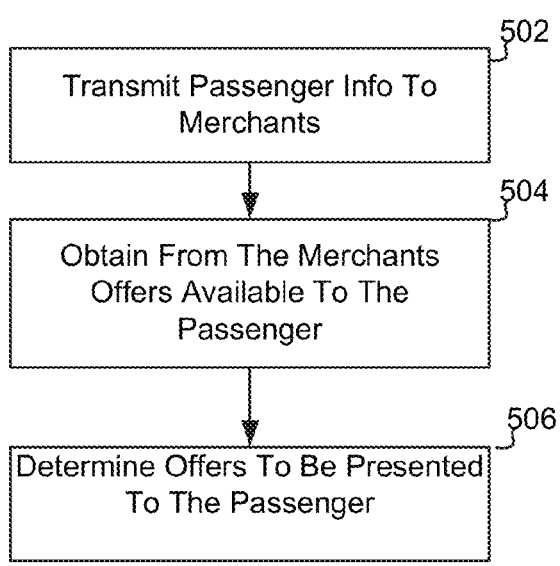
FIG. 5 illustrates a method of transmitting passenger information to merchants to enable the merchants provide target offers to the passengers.

FIG. 5 illustrates a method 500 of transmitting passenger information to merchants to enable the merchants provide target offers to the passengers. The operations of method 500 presented below are intended to be illustrative. In some embodiments, method 500 may be accomplished with one or more additional operations not described, and/or without one or more of the operations discussed. Additionally, the order in which the operations of method 500 are illustrated in FIG. 5 and described below is not intended to be limiting.

In some embodiments, method 500 may be implemented in one or more processing devices (e.g., a digital processor, an analog processor, a digital circuit designed to process information, an analog circuit designed to process information, a state machine, and/or other mechanisms for electronically processing information). It will be described with references to FIG. 3. The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, passenger information may be transmitted to the merchants. The passenger information transmitted in operation 502 may include itinerary information extracted in operation 304, historical information, and/or other information related to the passenger to servers associated with the merchants to facilitate the merchants to provide offers that may target the passenger. By way of a non-limiting example, itinerary information such as dates and time when a passenger will travel to a destination, historical information such as travel products purchased by the passenger in the past, product preferences manifested by the passenger and/or other historical information may be transmitted to the servers associated with merchants in operation 502 to enable the merchants to determine specific offers that may target the passenger. In some implementations, operation 502 may be performed by an offer module the same as or similar to offer module 124 (shown in FIG. 1 and described herein).

At an operation 504, offers may be obtained from the merchants. In some implementations, operation 504 may be performed by an offer module the same as or similar to offer module 124 (shown in FIG. 1 and described herein).

At an operation 506, offers may be determined to be presented to the passenger in an electronic message based on the offers obtained in operation 504. This may involve examining the historical information of the passenger (e.g., manifested preferences), analyzing destinations of the passengers in the current reservation, determining social interests of the passenger and/or any other operations. One or more offers from the offers obtained in operation 504 may be determined based on such examination and/or analysis. In some implementations, operation 504 may be performed by an offer module the same as or similar to offer module 124 (shown in FIG. 1 and described herein).

It should be appreciated the present technology described herein may be applied to other medium other than electronic messages including flight reservation information. Such medium may include, but not limited to, printed boarding passes, printed tickets for flight, theater, sports, show and/or any other events, digital tickets (e.g., passes displayed on a mobile device), display media (e.g., devices) and/or any other medium for any other purposes. Advertisement platforms based on such medium in accordance with the present technology described herein are also contemplated.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A system for facilitating passengers to manage airline reservations within emails, the system comprising:
one or more processors configured by machine readable instructions to:
receive reservation information regarding airline reservations associated with passengers, the received reservation information comprising first reservation information regarding a first airline reservation associated with a first passenger;
obtain itinerary information associated with the passengers based on the reservation information, the obtained itinerary information including first itinerary information associated with the first passenger indicating that the first passenger has made a reservation on a first flight for a first passage to a first destination;
obtain flight information regarding flights on which reservations have been made for passengers as indicated by the itinerary information, the flight information comprising a current status of a plurality of assignable seats for the flights on which reservations have been made, the status being changeable prior to a time at which the flights are scheduled to begin, and determine, based on the obtained flight information, flight options available to the passengers for purchase such that responsive to the first itinerary information associated with the first passenger indicating that the first passenger has made a reservation on the first flight, the one or more processors:
obtains first flight information regarding the first flight, and
determines a first set of flight options available to the first passenger for purchase based on the first flight information;
dynamically determine interactive content for inclusion in the emails, the dynamically determined interactive content including interactive content sets facilitating passengers to purchase the flight options such that the dynamically determined interactive content includes a first interactive content set for facilitating the first passenger to purchase the first set of flight options;
generate interactive electronic messages emails for interaction by the passengers, the generated interactive emails including the interactive content sets such that the one or more processors generates a first interactive email for interaction by the first passenger, the first interactive email including the first interactive content set,
wherein:
the interactive content sets include selectable options to select or purchase the flight options, the selectable options further include a visual mapping of the plurality of assignable seats and the current status of the plurality of assignable seats, with at least any of the plurality of seats having an available status being selectable:
the generated interactive emails are Internet Message Format compliant or Multipurpose Internet Mail Extensions compliant, individual generated interactive emails including a message header section and a message body section:
the dynamically determined interactive content for inclusion in the emails includes elements that cause dedicated email clients displaying the generated interactive emails on client computing platforms to present the dynamically determined interactive content natively within the message body section of the generated interactive emails without using any other applications outside of the dedicated email clients; and
the presentation of the dynamically determined interactive content within the message body section of the generated interactive emails includes presentation of the selectable options to select or purchase the flight options within the message body section of the generated interactive emails;
cause transmission of the first interactive email to an email address associated with the first passenger;
receive, responsive to the first interactive email being accessed by a dedicated email client, a request for updated status data for the plurality of assignable seats; and
transmit, to the dedicated email client accessing the first interactive email, updated status data for the plurality of assignable seats, to enable the dedicated email client to render an updated interactive visual mapping of the plurality of assignable seats upon the first interactive email being accessed.

2. The system of claim 1, wherein the one or more processors is further configured such that receiving reservation information regarding airline reservations associated with passengers comprises receiving such reservation information through electronic messages from client computing platforms associated with the passengers.

3. The system of claim 1, wherein the one or more processors is further configured to obtain historical information related to passengers such that the one or more processors obtains historical information related to the first passenger.

4. The system of claim 3, wherein the obtained historical information related to the first passenger includes information indicating products and/or services liked by the first passenger as manifested by one or more external accounts associated with the first passenger, travel products purchased by the first passenger in the past, reservation choices made for the first passenger in the past, product and/or service preferences manifested by the first passenger in the past, travel experiences of the first passenger in the past, and/or behaviors exhibited by the first passenger in the past travel experiences.

5. The system of claim 1, wherein the one or more processors is further configured such that the obtained flight information regarding the first flight includes information indicates seat assignments for existing passengers of the first flight, social media profiles associated with the existing passengers of the first flight, preferred seat assignments by the existing passengers, checked baggage by the existing passengers, flight upgrades made by the existing passengers of the first flight, levels of priority boarding selected by the existing passenger of the first flight, travel insurance associated with the existing passengers of the first flight, extra mileage accrual for loyalty program associated with the existing passengers of the first flight, airport lounge access available to the existing passengers of the first flight, meals purchased by the existing passenger of the first flight, destination information associated with the existing passenger of the first flight, priority boarding, advanced check-in, ground transportation or transfers, airport parking, pet carriage, car rental, destination activities, a price scheme for seat upgrades, a price scheme for in-flight meal, internet, and entertainment upgrades, a price scheme for luggage upgrades, a mileage program in connection with the first flight, and/or a promotion in connection with the first flight.

6. The system of claim 1, wherein the one or more processors is further configured to obtain sets of offers made by merchants, the offers in the obtained offer sets being related to destinations of the passengers as indicated in the itinerary information such that responsive to the first itinerary information indicating the first destination of the first flight passage reserved by the first passenger on the first flight, the one or more processors obtains a first set of offers related to the first destination, the first set of offers including a first offer made by a first merchant and wherein:

the one or more processors is further configured such that the determination of the interactive content for inclusion in the emails includes a determination of interactive content sets for facilitating the passengers to interact with the offers such that the dynamically determined interactive content includes a second interactive content set for facilitating the first passenger to interact with one or more offers in the first set of offers; and the one or more processors is further configured such that the first interactive email includes the second interactive content set.

7. The system of claim 6, wherein the one or more processors is further configured to transmit the first passenger itinerary information to the first merchant prior to obtaining the first offer from the first merchant.

8. The system of claim 6, wherein the one or more processors is further configured to select one or more offers from the first set of offers for inclusion in the second interactive content set.

9. The system of claim 6, wherein the one or more processors is further configured such that the dynamic determination of the first interactive content set for facilitating the first passenger to purchase the first set of flight options comprises generating controls by which the first passenger may purchase the first set of flight options within the first interactive email, and wherein one or more processors is further configured such that the dynamic determination of the second interactive content set for facilitating the first passenger to interact with the first set of offers comprises generating controls by which the first passenger may accept the first set of one or more offers within the first interactive email.

10. A method for facilitating passengers to manage airline reservations within emails, the method being electronically executed in one or more physical processors configured to execute computer programs, the method comprising:

receiving reservation information regarding airline reservations associated with passengers, the received reservation information comprising first reservation information regarding a first airline reservation associated with a first passenger;

obtaining itinerary information associated with the passengers based on the received reservation information, the obtained itinerary information including first itinerary information associated with the first passenger indicating that the first passenger has made a reservation on a first flight for a first passage to a first destination;

obtaining flight information regarding flights on which reservations have been made for passengers as indicated by the obtained itinerary information, the flight information comprising a current status of a plurality of assignable seats for the flights on which reservations have been made, the status being changeable prior to a time at which the flights are scheduled to begin, and determining, based on the obtained flight information, flight options available to the passengers for purchase such that, responsive to the first itinerary information associated with the first passenger indicating that the first passenger has made a reservation on the first flight, the one or more processors:

obtains first flight information regarding the first flight, and determines a first set of flight options available to the first passenger for purchase based on the first flight information;

dynamically determining interactive content for inclusion in the emails, the dynamically determined interactive content including interactive content sets facilitating passengers to purchase the flight options such that the dynamically determined interactive content includes a first interactive content set for facilitating the first passenger to purchase the first set of flight options;

generating interactive emails for interaction by the passengers, the generated interactive emails including interactive content sets such that a first interactive email is generated for interaction by the first passenger, the first interactive email including the first interactive content set, wherein:

the interactive content sets include selectable options to select or purchase the flight options, the selectable options further include a visual mapping of the plurality of assignable seats and the current status of the plurality of assignable seats, with at least any of the plurality of seats having an available status being selectable;

the generated interactive emails are Internet Message Format compliant or Multipurpose Internet Mail Extensions compliant, individual generated interactive emails including a message header section and a message body section;

the dynamically determined interactive content for inclusion in the emails includes elements that cause dedicated email clients displaying the generated interactive emails on client computing platforms to present the dynamically determined interactive content natively within the message body section of the generated interactive emails without using any other applications outside of the dedicated email clients; and the presentation of the dynamically determined interactive content within the message body section of the generated interactive emails includes presentation of the selectable options to select or purchase the flight options within the message body section of the generated interactive emails;

causing transmission of the first interactive email to an email address associated with the first passenger;

receiving, responsive to the first interactive email being accessed by a dedicated email client, a request for updated status data for the plurality of assignable seats; and transmitting, to the dedicated email client accessing the first interactive email, updated status data for the plurality of assignable seats, to enable the dedicated email client to render an updated interactive visual mapping of the plurality of assignable seats upon the first interactive email being accessed.

11. The method of claim 10, wherein the receiving reservation information regarding airline reservations associated with passengers comprises receiving such reservation information through electronic messages from client computing platforms associated with the passengers.

12. The method of claim 10, further comprising obtaining historical information related to passengers, the obtaining historical information related to passengers comprising obtaining historical information related to the first passenger.

13. The method of claim 12, wherein the obtained historical information related to the first passenger includes information indicating products and/or services liked by the first passenger as manifested by one or more external accounts associated with the first passenger, travel products purchased by the first passenger in the past, reservation choices made for the first passenger in the past, product and/or service preferences manifested by the first passenger in the past, travel experiences of the first passenger in the past, purchase behavior by the first passenger in the past from other airlines/service providers and/or behaviors exhibited by the passenger in the past travel experiences.

14. The method of claim 10, wherein the obtained flight information regarding the first flight includes information indicates seat assignments for existing passengers of the first flight, social media profiles associated with the existing passengers of the first flight, preferred seat assignments by the existing passengers, checked baggage by the existing passengers, flight upgrades made by the existing passengers of the first flight, levels of priority boarding selected by the existing passenger of the first flight, travel insurance associated with the existing passengers of the first flight, extra mileage accrual for loyalty program associated with the existing passengers of the first flight, airport lounge access available to the existing passengers of the first flight, meals purchased by the existing passenger of the first flight, destination information associated with the existing passenger of the first flight, priority boarding, advanced check-in, ground transportation or transfers, airport parking, pet carriage, car rental, destination activities, a price scheme for seat upgrades, a price scheme for in-flight meal, internet, and entertainment upgrades, a price scheme for luggage upgrades, a mileage program in connection with the first flight, and/or a promotion in connection with the first flight.

15. The method of claim 10, further comprising obtaining sets of offers made by merchants, the offers in the obtained offer sets being related to destinations of the passengers as indicated in the obtained itinerary information such that responsive to the first itinerary information indicating the first destination of the first flight passage reserved by the first passenger on the first flight being obtained, obtaining a first set of offers related to the first destination, the first set of offers including a first offer made by a first merchant, and wherein:

the determination of the interactive content for inclusion in the emails includes a determination of interactive content sets for facilitating the passengers to interact with the obtained offers such that the dynamically determined interactive content includes a second interactive content set for facilitating the first passenger to interact with one or more offers in the first set of offers; and the first interactive email includes the second interactive content set.

16. The method of claim 15, further comprising selecting one or more offers from the first set of offers for inclusion in the second interactive content set.

17. The method of claim 15, wherein the dynamic determination of the first interactive content set for facilitating the first passenger to purchase the first set of flight options available to the first passenger comprises generating controls by which the first passenger may purchase the one or more flight options within the first interactive email, and wherein the dynamic determination of the second interactive content set for facilitating the first passenger to interact with the first set of offers comprises generating controls by which the first passenger may accept the first set of offers within the first interactive email.

18. The system of claim 1, wherein browser plugins are embedded in the dedicated email clients to present the dynamically determined interactive content natively within the generated interactive emails.

19. The system of claim 1, wherein the dedicated email clients include a webmail.

20. The system of claim 1, wherein the plurality of seats as depicted in the visual mapping are configured to change visual appearance when selected to indicate that the particular seat is selected.

21. The system of claim 1, wherein the one or more processors are further configured to transmit further updated status data for the plurality of assignable seats upon each subsequent accessing of the first interactive email.

22. The system of claim 1, wherein the interactive content within the message body section of the generated interactive emails further includes presentation of static content within the message body section of the generated interactive emails, wherein the static content is based at least in part on the reservation information.

* * * * *